United States Patent [19]

Harte

[11] 4,065,858

[45] Jan. 3, 1978

[54] INSTRUCTIONAL APPARATUS WITH ELASTIC SHEET

[76] Inventor: James Richard Harte, 10 W. Concord, Kansas City, Mo. 64112

[21] Appl. No.: 714,315

[22] Filed: Aug. 16, 1976

[51] Int. Cl.² ............................................. G09B 3/08
[52] U.S. Cl. ..................................... 35/9 R; 35/48 A
[58] Field of Search ............. 35/9 R, 9 C, 48 R, 48 A

[56] References Cited

U.S. PATENT DOCUMENTS

| | | | |
|---|---|---|---|
| 3,106,027 | 10/1963 | Thelen | 35/9 C |
| 3,177,595 | 4/1965 | Yonker et al. | 35/9 C X |
| 3,421,231 | 1/1969 | Kane | 35/9 C |
| 3,747,229 | 7/1973 | Harte | 35/9 R |
| 3,964,176 | 6/1976 | Harte | 35/9 R |

*Primary Examiner*—William H. Grieb
*Attorney, Agent, or Firm*—D. A. N. Chase

[57] ABSTRACT

Instructional apparatus employs a holding mechanism which has depressions in its upper surface of either one depth or different depths. A printed format containing pre-punched openings representing answer selections is disposed over the upper surface, and some or all of the openings are aligned with corresponding depressions. Sandwiched between the printed format and the upper surface is a highly elastic sheet of rubber-like material. The user pushes a rounded tip stylus through the selected opening and thence into the elastic sheet, and the degree of penetration by the stylus through the upper surface down into an underlying depression or hole indicates the correctness of the response and provides instantaneous feedback. Upon withdrawal of the stylus the elastic sheet returns to its former shape with no deformation; thus the apparatus may be used by many students without replacing formats or other used components.

9 Claims, 4 Drawing Figures

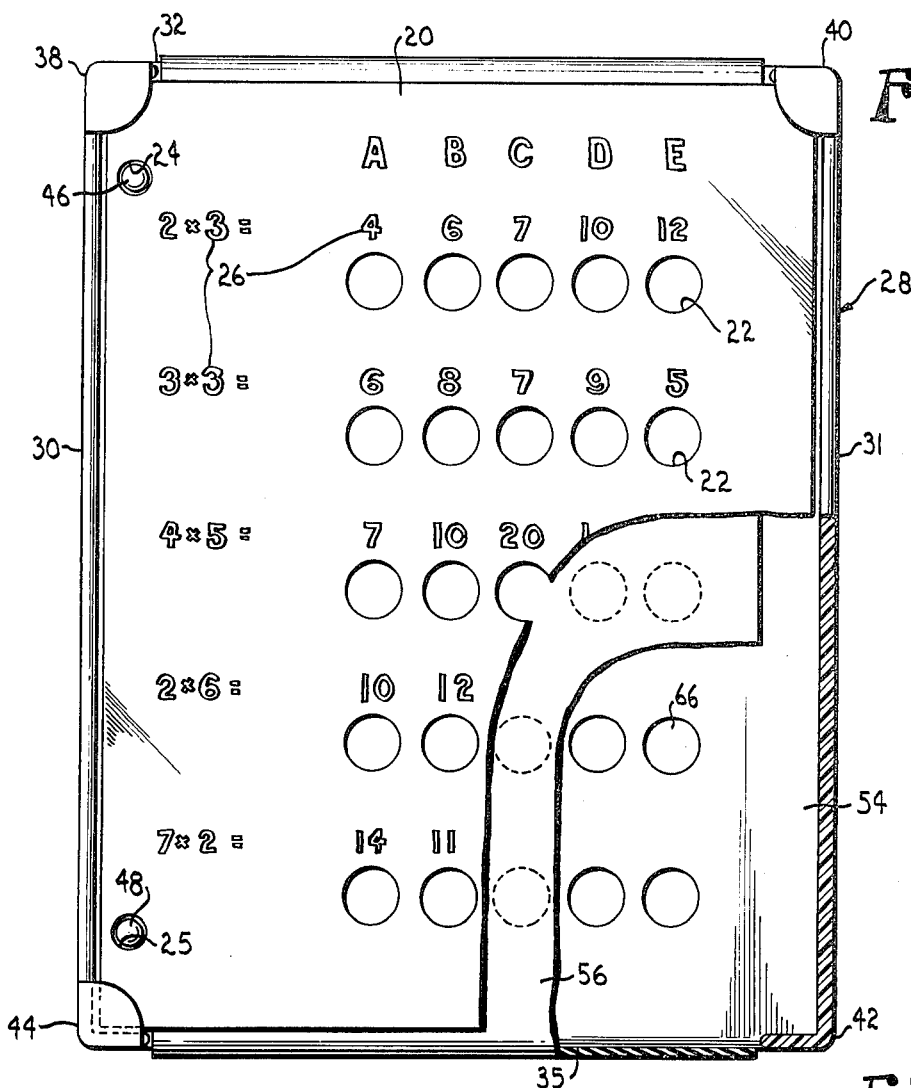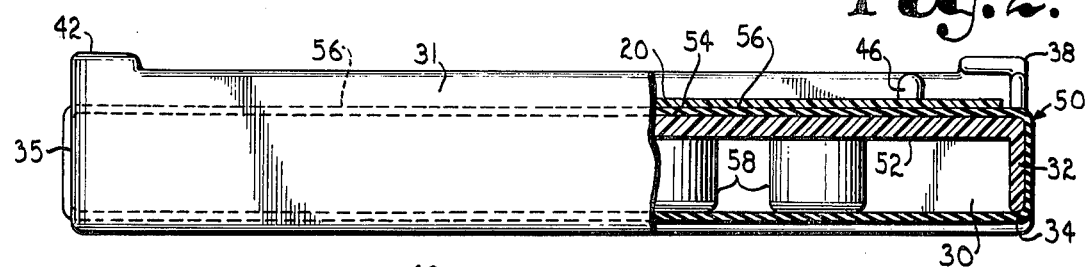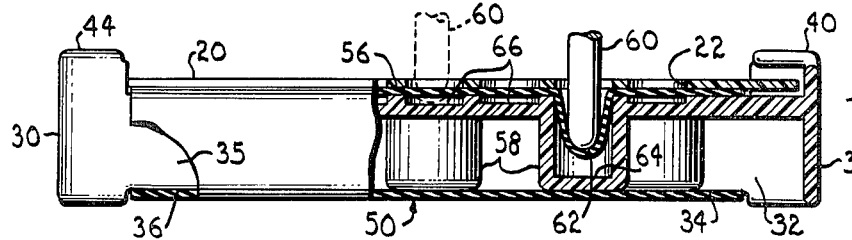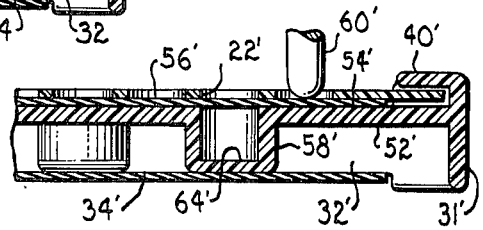

INSTRUCTIONAL APPARATUS WITH ELASTIC SHEET

CROSS-REFERENCES

Harte, U.S. Pat. Nos. 3,747,229 and 3,964,176.

This invention relates to improvements in instructional apparatus of the type disclosed in the above-referenced patents.

My prior work in educational self-instructional and self-testing apparatus having immediate response feedback includes the development of a holding mechanism with depressions in its upper surface of different depths or shapes covered by a printed format in which the user makes his own holes by use of a stylus, thus maintaining a record of his responses. A variation of the above is to replace the selection areas printed on the format with accurately punched holes for receiving the stylus, a blank response sheet being sandwiched between the format and the upper surface of the mechanism. Different depths of penetration of the stylus produce different size holes in the response sheet to indicate the correctness, degree of correctness, or incorrectness of the responses selected.

Although these prior devices may be advantageously utilized in numerous instructional situations, they all require continual replacement of either the printed formats or the response sheets after each use. This is not burdensome in those cases where a permanent record of the student's work is desired, as the used materials are kept and become a convenient means by which the student's progress may be monitored. Oftentimes, however, the advantage of immediate feedback to the student provided by instructional apparatus of this type is desired, but a permanent record of the student's work is neither desired nor required and the continual handling of used formats and response sheets is merely extra paperwork that does not contribute to the instructor's objective.

It is, therefore, the primary object of the present invention to provide instructional apparatus of the type discussed above which provides the requisite instantaneous response feedback to the student but does not require that formats or response sheets be replaced after each use.

As a corollary to the foregoing object, it is an important aim of this invention to provide such an apparatus which requires no make-ready whatsoever unless it is desired to change the format so that the student will be presented with a different set of problems for solution.

Still another important object of the invention is to provide instructional apparatus as aforesaid that stimulates the user's attention and enthusiasm.

In furtherance of the immediately preceding object, it is an important aim of this invention to provide such an apparatus in which the quality of the resistance of the student's stylus to penetration is indicative of the correctness, degree of correctness, or incorrectness of the responses selected.

Yet another important object is to provide instructional apparatus as aforesaid having instantaneous feedback to the student through the provision of an elastic medium which the stylus contacts at the time of making each answer selection.

Other objects and uses of the present invention will become readily apparent to those skilled in the art upon a perusal of the following specification in light of the accompanying drawings, in which:

FIG. 1 is a plan view of the instructional apparatus with parts being broken away to reveal details of construction. The apparatus shown includes a printed and punched format overlying a taut elastic sheet, the format being correctly aligned and positioned within a holding mechanism and the elastic sheet being held in position thereon by its elasticity.

FIG. 2 is a side elevational view of the instructional apparatus shown in FIG. 1 with parts being broken away to reveal details of construction. The vertical relationships of the components are shown, and the elastic loop is seen extending across the upper surface of the holding mechanism, over one end, and back across the bottom.

FIG. 3 is a frontal, end elevational view of the instructional apparatus shown in FIG. 1 with parts being broken away to reveal details of construction. Two styluses are shown, one in phantom lines, illustrating the deflection of the elastic sheet into both a deep hole and shallow hole.

FIG. 4 is a fragmentary, vertical cross-sectional view of a modified form of the device shown in FIGS. 1–3, employing holes of a single depth.

DETAILED DESCRIPTION

Referring to FIGS. 1–3, a printed format 20 contains five rows of pre-punched openings 22 for answer selections, and a pair of alignment holes 24 and 25. The printed material 26 on format 20 represents multiplication problems and a series of five possible correct answers A, B, C, D and E for each, such answers being associated with corresponding openings 22. Printed format 20 is held in proper alignment by a rectangular frame 28 having holding corners 38, 40, 42 and 44 and provided with upright alignment pins 46 and 48. The frame 28 is formed by a left longitudinal side portion 30, right longitudinal side portion 31, rear end portion 32 having a bottom recess 34, and front end portion 35 having a bottom recess 36. The printed format 20 is positioned so that its two alignment holes 24 and 25 receive pins 46 and 48 respectively. The four corners of the rectangular format 20 fit in corresponding holding corners 38, 40, 42 and 44 beneath the inwardly projecting corner rims as is clear in FIGS. 2 and 3.

As is apparent from the foregoing, the holding frame 28 is constructed such that the printed format 20 may be easily and rapidly inserted and removed and replaced with a different format when it is desired to confront the student with a different set of problems, thereby allowing a wide variety of formats to be used. The entire holding mechanism including the frame 28, integral holding corners 38–44, alignment pins 46 and 48, and other components to be described may be molded as a one-piece assembly from any of various plastic materials. This provides a durable device of unitary construction which is relatively inexpensive to produce in quantity for educational use.

It may be noted in FIGS. 2 and 3 that the front and rear end portions 35 and 32 of the frame 28 are shorter in vertical expanse than the longitudinal side portions 30 and 31, whose ends merge with the inwardly projecting, elevated corner rims of the holding corners 38–44. Accordingly, a recess is effectively formed along the upper edge of each of the front and rear end portions 35 and 32 between the holding corners 42, 44 and 38, 40 respectively. An opaque, elastic band broadly denoted by the reference numeral 50 is looped around the frame 28 from front to rear, and extends over these recessed upper edges of end portions 35 and 32 and is received within their bottom recesses 36 and 34.

A flat, relatively thin, horizontally disposed base member 52 is integrally formed with the frame 28 and presents the upper surface 54 of the mechanism, such surface being even with the upper edges of the front and rear end portions 35 and 32. Accordingly, the upper stretch of the elastic band 50 directly overlies surface 54 and presents a planar sheet 56 sandwiched between such surface 54 and the overlying printed format 20. By virtue of the bottom recesses 34 and 36, the lower stretch of the belt-like loop or band 50 does not rest on the supporting surface (such as a tabletop, not shown) upon which the apparatus is used by the student.

FIGS. 2 and 3 reveal the interior construction of the mechanism, and protuberances 58 may be seen depending from the base member 52 and formed integrally therewith in the molding process. These protuberances 58 contain internal depressions defining deep holes in the upper surface 54 corresponding to correct answer selections made by a student using a stylus such as fragmentarily illustrated at 60 in FIG. 3. The stylus 60 has a rounded tip 62 shown (in FIG. 3) inserted into a deep hole 64 formed within the corresponding protuberance 58 and communicating with the upper surface 54 of the base member 52. Shallow holes shown at 66 correspond to incorrect answer selections and are formed by depressions in the base member 52. All holes 64 and 66 in the surface 54 are of circular cross-sectional configuration, and have the same diameter as and are in direct alignment with the openings 22 in format 20.

The elastic band 50 may be composed of any suitable natural or synthetic rubber having the resilient characteristics of the rubber material used for common rubber bands. The elastic sheet 56 is preferably presented by a wide loop or endless belt as provided herein by the band 50 since the continuous loop configuration has a number of advantages. First, the construction of the device is simple as the band 50 may be simply stretched and slipped in place. Secondly, the ability to advance the belt (rotate the loop) is important in the event that certain areas thereof are subjected to excessive wear or become marked by a student either inadvertently or to denote correct answers. Furthermore, replacement of a worn belt 50 is readily accomplished by stretching the loop to an oversize condition and slipping it over the holding mechanism.

Referring now to FIG. 4, a modified version of the device of the present invention is shown, and is essentially identical to the embodiment of FIGS. 1-3 except that there are no shallow holes in the upper surface 54' of the base member 52'. Like components are denoted by the same reference numerals as in FIGS. 1-3 with the addition of the prime notation.

In use, the quality of the resistance that the student senses when operating the stylus 60 indicates whether the response is correct or incorrect. In the usual case, the shallow holes 66 indicate incorrect answers and the deep holes 64 indicate correct answers (or they may represent degrees of correctness or incorrectness as dictated by the problem and solution). In this connection, it is preferable that a stylus as illustrated having the rounded tip 62 be employed, as a sharp pointed stylus would tend to punch through the elastic sheet 56 and increase its rate of wear and destruction. Furthermore, a sharp pointed stylus does not give the same quality of resistance when pushed against a correct response area, since penetration of the sharp tip into the elastic sheet reduces the amount of deflection. As is clear in FIG. 3, the stylus 60 produces a very significant deflection of the sheet 56 into the deep hole 64; the exact degree, of course, depends upon the force applied by the student.

The taut elastic sheet 52 obscures the underlying holes 64 and 66 and their relative depths from the student's view so that correct answers cannot be anticipated. Assuming that the student inserts the stylus 60 through an opening 22 aligned with a shallow hole 66, only a slight deflection of the elastic sheet 56 will occur and firm resistance is rapidly sensed as the stylus is inserted. However, when the stylus is pushed through a correct response area and into an underlying deep hole 64, the student experiences an elastic or springlike sensation due to the large deflection. Accordingly, if a correct response is made, the user finds that continuous pressure is necessary to maintain the stylus inserted through the selected opening 22 and, when pressure is removed (the stylus released), the resilience of the taut sheet 56 ejects the stylus from the hole. Therefore, in the present invention the feedback is indeed instantaneous and the student by the sensation produced is made unequivocally aware of the correctness or incorrectness of the selected response.

The device of FIG. 4 operates in the same manner as above except that the sheet 56' will not be deflected at all if the incorrect answer is selected. However, if the stylus 60' is inserted through a punched opening 22' corresponding to a correct answer, the sensation discussed above as the stylus enters the corresponding deep hole 64' occurs in the same manner.

Since no permanent record is made with the apparatus of the present invention and the elastic sheet returns to its original, planar disposition with no permanent deformation, the device may be continually reused by merely changing formats as dictated by the course of instruction. Also, the device may be operated using one's fingertip rather than a stylus, a particularly useful option in instructional situations where the students are young children.

When it is necessary to advance the endless belt provided by the band 50, this is readily accomplished by rotating the loop in a front-to-rear or rear-to-front direction longitudinally of the frame 28 to present a fresh sheet 56 on the upper surface 54. Note in this connection that the width of the band 50 is limited to a dimension that fits within the bottom recesses 34 and 36 and is clear of the holding corners 38-44. Therefore, the longitudinal edges of the band 50 are inside and clear of the holding margin of the printed format 20 so that there is no interference with the alignment pins 46 and 48 or the holding corner structures.

Having thus described the invention, what is claimed as new and desired to be secured by Letters Patent is:

1. An instructional apparatus comprising: a holding mechanism provided with an upper surface having
    a plurality of holes therein of substantial depth; a printed format having openings therethrough indicating answer choices,
    said mechanism having means engageable with said format for holding the same on said upper surface in overlying relationship thereto with at least certain of said openings in alignment with corresponding holes in said upper surface, said openings and said holes being adapted to receive a stylus, finger or the like used by a student to make answer selections;

a sheet of rubber-like material sandwiched between said format and said upper surface and having a normal, planar disposition, said sheet being capable of substantial deflection into an individual hole when said stylus, finger or the like is inserted thereinto through the corresponding aligned opening; and means maintaining said sheet in a taut, resilient condition over said holes in the surface whereby, upon removal of pressure applied to the sheet by the stylus, finger or the like, the rubber-like material at the opening springs back to return said sheet to its normal disposition with no permanent deformation, the quality of resistance thus presented providing an instantaneous response feedback.

2. The instructional apparatus as claimed in claim 1, wherein said upper surface also has a plurality of holes therein of relatively shallow depth, said means of said mechanism holding said format such that others of said openings are in alignment with corresponding shallow holes in said surface, said shallow holes and said deep holes each indicating a differing type of response, and said sheet being capable of deflecting to a lesser or greater degree into the shallow and deep holes respectively in order to provide a distinctive feedback depending upon the selection made.

3. The instructional apparatus as claimed in claim 1, wherein said holes of substantial depth are the only holes in said upper surface and are all of the same depth said surface having means supporting said sheet to prevent deflection thereof except at areas of said sheet overlying said holes.

4. The instructional apparatus as claimed in claim 1, wherein is provided an endless band of elastic material looped over said mechanism and presenting a normally upper stretch defining said sheet, the remainder of said band constituting said maintaining means.

5. The instructional apparatus as claimed in claim 4, wherein said sheet is movable in a predetermined direction over said surface upon rotation of said band, whereby to present a fresh stretch of said material between said format and said surface.

6. The instructional apparatus as claimed in claim 5, wherein said format presents a holding margin and said holding means is engageable with said margin, and wherein said band is narrower than said format transversely of said direction of movement to present opposed edges inside and clear of said holding means.

7. The instructional apparatus as claimed in claim 1, wherein said format has holes therein in addition to said openings, said holding means including alignment pins received within corresponding holes in said format.

8. The instructional apparatus as claimed in claim 1, further comprising a stylus having a rounded tip for insertion into said openings and underlying holes.

9. In an instructional apparatus employing a holding mechanism provided with a normally upper surface having holes therein at least some of which are of substantial depth, and a printed format having openings therethrough indicating answer choices and held by said mechanism over said upper surface with at least certain of said openings in alignment with corresponding holes of substantial depth in said surface, the improvement comprising:

a sheet of rubber-like material sandwiched between said format and said upper surface and having a normal, planar disposition, said sheet being capable of substantial deflection into an individual hole of substantial depth when a stylus, finger or the like is inserted thereinto through the corresponding aligned opening; and means maintaining said sheet in a taut, resilient condition over said holes in the surface whereby, upon removal of pressure applied to the sheet by the stylus, finger or the like, the rubber-like material at the opening springs back to return said sheet to its normal disposition with no permanent deformation, the quality of resistance thus presented providing an instantaneous response feedback.

* * * * *

UNITED STATES PATENT OFFICE
CERTIFICATE OF CORRECTION

PATENT NO. : 4,065,858
DATED : January 3, 1978
INVENTOR(S) : JAMES RICHARD HARTE It is certified that error appears in the above-identified patent and that said Letters Patent are hereby corrected as shown below:

Column 4, Claim 1, lines 56-60, the paragraphing is incorrect. Lines 56 and 57, there should be a paragraph before "a holding" and no paragraph before "a plurality"; lines 58 and 59, there should be a paragraph before "a printed format".

Column 5, Claim 3, line 29, there should be a comma after "depth".

Signed and Sealed this

Thirteenth Day of June 1978

[SEAL]

Attest:

RUTH C. MASON
Attesting Officer

DONALD W. BANNER
Commissioner of Patents and Trademarks